BLACK LEVEL STABILIZATION CIRCUIT

Filed Sept. 7, 1961

Inventor
C.A. Barnard
By Holcombe Wetherill & Brisebois
Attorneys

United States Patent Office 3,145,263

Patented Aug. 18, 1964

3,145,263

BLACK LEVEL STABILIZATION CIRCUIT

Clifford Albert Barnard, Cambridge, England, assignor to Pye Limited, Cambridge, England, a British company Filed Sept. 7, 1961, Ser. No. 136,607

Claims priority, application Great Britain Sept. 3, 1960

10 Claims. (Cl. 178—7.3)

The present invention relates to a circuit arrangement for obtaining a gain control voltage which may be applied to amplifiers in order to stabilize the black level of a composite video waveform contained in a modulated carrier wave.

According to the present invention the television waveform obtained from the amplifier output is detected and is D.C. coupled to a gating device where it is gated by means of gating pulses at least during a portion of the television waveform which is capable of providing a reference potential so as to produce a pulse output waveform including a portion whose amplitude depends upon the D.C. level of said reference portion of the television waveform, said pulse output waveform being A.C. coupled to a clamp circuit which clamps the output to a preset D.C. potential during a part of the said reference portion of the waveform and then being filtered or smoothed to produce a D.C. control voltage which is applied to control the gain of said amplifier.

The gating device may consist of a pentode valve and the television waveform be applied to the suppressor grid whilst line frequency gating pulses are applied to its control grid. The gating pulses can be derived from or constitute line synchronizing pulses.

The clamped waveform is preferably fed to the filter circuit through a cathode follower control stage. The clamp circuit may be controlled by pulses derived from a television waveform generator.

The circuit according to the present invention may be employed both in television transmitters and in television receivers.

As applied to transmitters the video signal is obtained by sampling the output of the transmitter and a stable amplifying circuit may be included between the gating device and the control device. The D.C. control voltage may be applied to the modulator of the transmitter to compensate for variations in the emission of the radio frequency amplifier or amplifiers. Alternatively the D.C. control voltage may be applied to one or more R.F. stages of the transmitter which are selected to function in addition as a control stage or stages to compensate for variations in the emission or performance of the R.F. amplifier chain as a whole.

In a television receiver the D.C. control voltage may be employed as an automatic gain control voltage acting on the radio frequency or intermediate frequency amplifying stages of the receiver.

Figure 1:
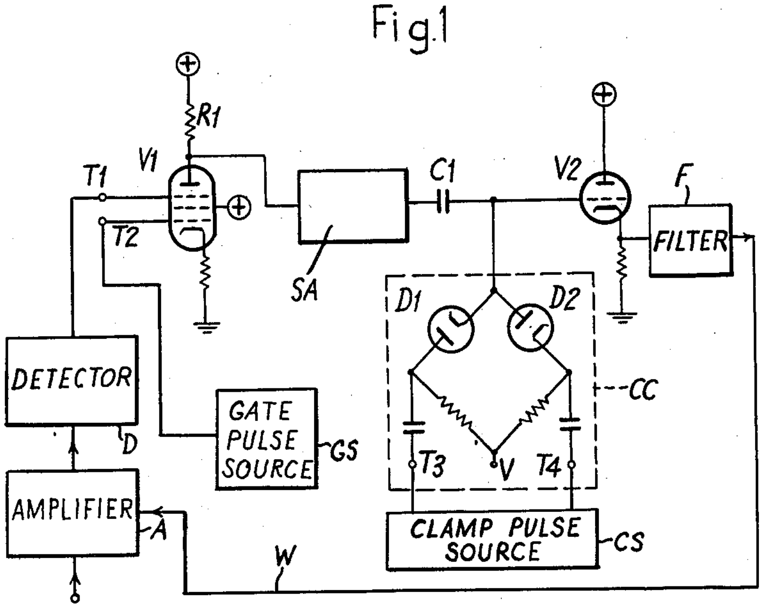
Figure 2:
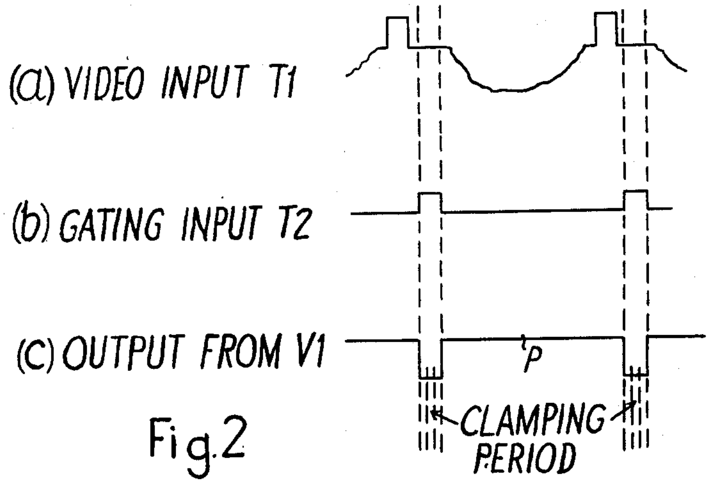

The invention will now be further described with reference to the accompanying drawing, in which:

FIGURE 1 is a simplified circuit diagram of one embodiment according to the invention, and FIGURE 2 shows explanatory waveforms.

Referring to the drawing, a television waveform whose black level is to be stabilized in the amplifier A, is detected by detector D and applied via terminal T1 to the suppressor grid of a pentode gating valve V1 which is normally cut-off but which is made conducting by the application of line frequency gating pulses to its control grid from the gating pulse source GS via terminal T2. These gating pulses have a width of about 4 to 5 microseconds and may be obtained for example by differentiation and shaping of the line synchronizing pulses of the waveform. The pulse voltage developed across the anode load R1 of the pentode is A.C. coupled through condenser C1 to the clamp circuit CC comprising two diodes D1, D2 which are fed with clamping pulses from the clamping pulse source CS via terminals T3 and T4, to clamp the signal to a D.C. reference potential V for approximately 2 microseconds during the back porch period. The clamp pulses may be derived from a television waveform generator. The reference potential V will be chosen to obtain the correct working condition in the valve V2. The clamped waveform is then applied to the control grid of this further valve V2 which is arranged as a cathode follower and which is inherently stable, the output from V2 being filtered or smoothed in circuit F to produce a D.C. control voltage. The D.C. control voltage is applied to amplifier A over conductor W to control the gain of one or more of its stages so as to stabilize the black level of the television waveform.

Where the circuit is employed in transmitters a stable amplifier SA may be added between the gating valve V1 and the control valve V2.

FIGURE 2 shows explanatory waveforms, and it will be seen that in the circuit according to the present invention the output control voltage is obtained from the long duration positive pulse periods P, which are of the order of the duration of the line periods and are equivalent to the cut-off periods at the anode of the gating valve V1. The amplitude of the pulses P depend upon the amplitude of the synchronizing pulses. The gating pulses themselves have negligible effect on this control voltage and are not critical in width or time as a variation of say 20% in the pulse width, i.e. a variation of 1 microsecond in a 5 microsecond gating pulse only produces about 1% variation of the long cut-off pulse period P. Furthermore overlap of the gating pulses into the synchronizing pulse period has no effect on the output and therefore the phasing of the pulses is not critical. This in turn enables the equipment to be simplified.

Whilst a particular embodiment has been described it will be understood that various modifications may be made without departing from the scope of this invention. For example where a color television signal is being stabilized and a color synchronizing H.F. burst is present in the back porch period, the reference potential may be obtained from the front porch or the synchronizing pulse tip. The gating pulses may still be relatively broad and it is only necessary precisely to time the clamping pulses.

I claim:

1. An automatic gain control circuit for controlling the gain of a television signal amplifier in order to stabilize the black level of a composite television waveform contained in a modulated carrier wave, comprising means for feeding the television waveform to said amplifier, means for detecting the television waveform obtained from the output of said amplifier, a gating device, means for D.C. coupling the detected waveform to the gating device, a source of gating pulses, means for feeding the gating pulses to said gating device to gate the television waveform at least during a portion of the television waveform which is capable of providing a reference potential, so as to produce from the gating device a pulse output waveform which extends between the gating periods and which has an amplitude depending upon the D.C. level of the reference portion of the television waveform, a clamp circuit, means for applying a D.C. potential to the clamp circuit, means for A.C. coupling the pulse output waveform from the gating device to the clamp circuit, a clamp pulse source for controlling said clamp circuit to clamp said pulse output waveform from the gating device to the D.C. potential applied to said clamp circuit during a part of said reference portion of the television waveform, a filter circuit, means for D.C. connecting the clamped waveform to said filter circuit to produce a D.C. control voltage and means for feeding said D.C. control voltage to control the gain of said amplifier.

2. A circuit arrangement as claimed in claim 1, in which the gating device consists of a pentode valve having a control grid and a suppressor grid and the detected television waveform is supplied to the suppressor grid whilst the gating pulses are applied to the control grid of the valve.

3. A circuit as claimed in claim 1, in which a stable amplifying circuit is included between the gating device and the clamp circuit.

4. A circuit as claimed in claim 1, in which the gating pulses are derived from the line frequency synchronizing pulses of the television waveform.

5. An automatic gain control circuit for controlling the gain of a television signal amplifier in order to stabilize the black level of a composite television waveform contained in a modulated carrier wave, comprising means for feeding the television waveform to said amplifier, means for detecting the television waveform obtained from the output of said amplifier, a gating device, means for D.C. coupling the detected waveform to the gating device, a source of gating pulses, means for feeding the gating pulses to said gating device to gate the television waveform at least during a portion of the television waveform which is capable of providing a reference potential, so as to produce from the gating device a pulse output waveform which extends between the gating periods and which has an amplitude depending upon the D.C. level of the reference portion of the television waveform, a clamp circuit, means for applying a D.C. potential to the clamp circuit, means for A.C. coupling the pulse output waveform from the gating device to the clamp circuit, a clamp pulse source for controlling said clamp circuit to clamp said pulse output waveform from the gating device to the D.C. potential applied to said clamp circuit during a part of said reference portion of the television waveform, a cathode follower, means for D.C. connecting the clamped waveform to said cathode follower, a filter circuit, means for D.C. connecting the output of said cathode follower to said filter circuit to produce a D.C. control voltage and means for feeding said D.C. control voltage to control the gain of said amplifier.

6. An automatic gain control circuit for controlling the gain of a television signal amplifier in order to stabilize the black level of a composite television waveform contained in a modulated carrier wave, comprising means for feeding the television waveform to said amplifier, means for detecting the television waveform obtained from the output of said amplifier, a gating device, means for D.C. coupling the detected waveform to the gating device, a source of gating pulses, means for feeding the gating pulses to said gating device to gait the television waveform at least during the post synchronizing pulse black level periods of the television waveform, so as to produce from the gating device a pulse output waveform which extends between the gating periods and which has an amplitude depending upon the black level of the television waveform, a clamp circuit, means for applying a D.C. potential to the clamp circuit, means for A.C. coupling the pulse output waveform from the gating device to the clamp circuit, a clamp pulse source for controlling said clamp circuit to clamp said pulse output waveform from the gating device to the D.C. potential applied to said clamp circuit during a part of said reference portion of the television waveform, a filter circuit, means for D.C. connecting the clamped waveform to said filter circuit to produce a D.C. control voltage and means for feeding said D.C. control voltage to control the gain of said amplifier.

7. A circuit arrangement as claimed in claim 6, in which the gating device consists of a pentode valve having a control grid and a suppressor grid and the detected television waveform is supplied to the suppressor grid whilst the gating pulses are applied to the control grid of the valve.

8. A circuit as claimed in claim 6, in which a stable amplifying circuit is included between the gating device and the clamp circuit.

9. A circuit as claimed in claim 6, in which the gating pulses are derived from the line frequency synchronizing pulses of the television waveform.

10. An automatic gain control circuit for controlling the gain of a television signal amplifier in order to stabilize the black level of a composite television waveform contained in a modulated carrier wave, comprising means for feeding the television waveform to said amplifier, means for detecting the television waveform obtained from the output of said amplifier, a gating device, means for D.C. coupling the detected waveform to the gating device, a source of gating pulses, means for feeding the gating pulses to said gating device to gate the television waveform at least during the post synchronizing pulse black level periods of the television waveform, so as to produce from the gating device a pulse output waveform which extends between the gating periods and which has an amplitude depending upon the black level of the television waveform, a clamp circuit, means for applying a D.C. potential to the clamp circuit, means for A.C. coupling the pulse output waveform from the gating device to the clamp circuit, a clamp pulse source for controlling said clamp circuit to clamp said pulse output waveform from the gating device to the D.C. potential applied to said clamp circuit during a part of said reference portion of the television waveform, a cathode follower, means for D.C. connecting the clamped waveform to said cathode follower, a filter circuit, means for D.C. connecting the output of said cathode follower to said filter circuit to produce a D.C. control voltage and means for feeding said D.C. control voltage to control the gain of said amplifier.

References Cited in the file of this patent

UNITED STATES PATENTS

| | | |
|---|---|---|
| 2,792,496 | Rhodes | May 14, 1957 |
| 2,934,602 | Cope et al. | Apr. 26, 1960 |

FOREIGN PATENTS

| | | |
|---|---|---|
| 649,141 | Great Britain | Jan. 17, 1951 |